F. L. LANE & H. J. MITCHELL.
PROFILE CUTTER HEAD.
APPLICATION FILED JUNE 27, 1912.
1,096,847.
Patented May 19, 1914.
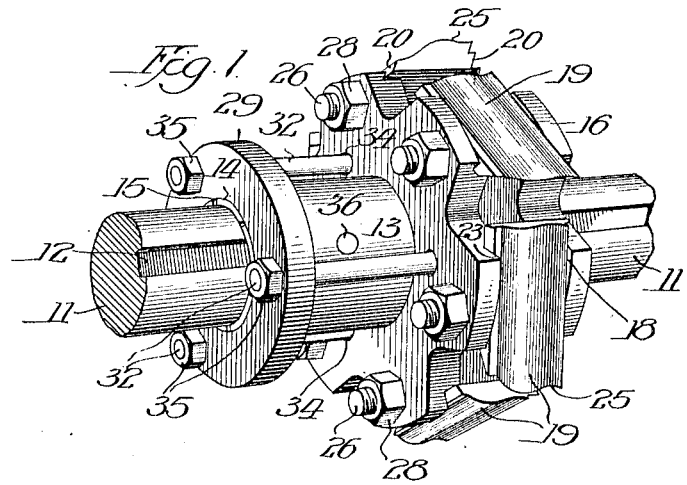
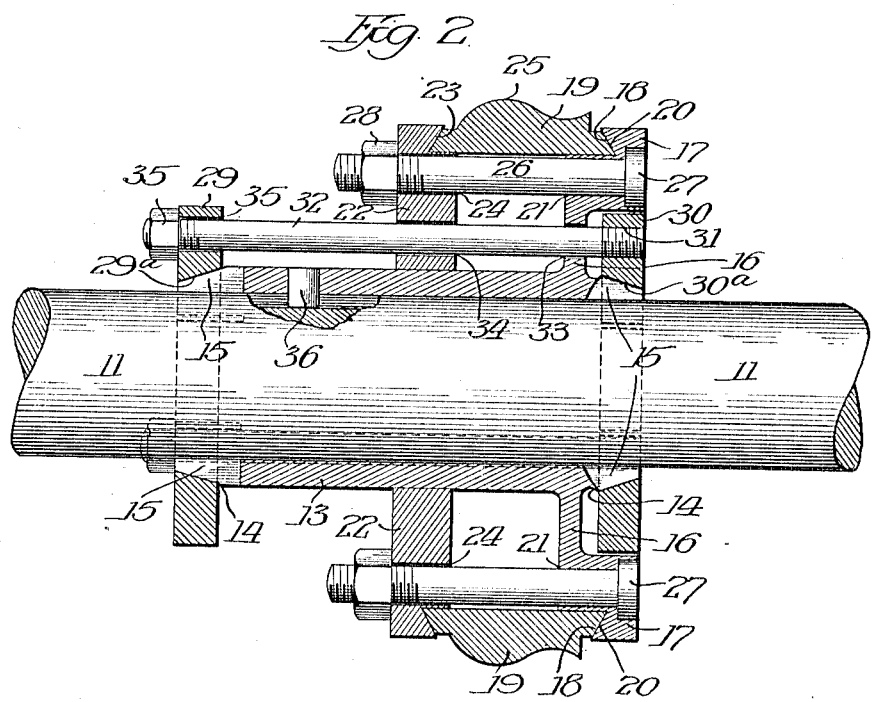

UNITED STATES PATENT OFFICE.

FRANKLIN L. LANE AND HARRISON J. MITCHELL, OF BELOIT, WISCONSIN, ASSIGNORS TO THE BERLIN MACHINE WORKS, OF BELOIT, WISCONSIN, A CORPORATION OF WISCONSIN.

PROFILE CUTTER-HEAD.

1,096,847.        Specification of Letters Patent.        Patented May 19, 1914.

Application filed June 27, 1912. Serial No. 706,150.

*To all whom it may concern:*

Be it known that we, FRANKLIN L. LANE and HARRISON J. MITCHELL, citizens of the United States, residing at Beloit, in the county of Rock and State of Wisconsin, have invented certain new and useful Improvements in Profile Cutter-Heads, of which the following is a specification.

Our invention relates to cutter heads and more particularly profile cutter heads adapted for the manufacture of matched or drop siding and comprising a pair of companion tool-holding plates or flanges having relative movement axially of the spindle or arbor whereby to clamp the tools in adjusted operative relation.

The principal objects of the invention are the provision of means for self-centering the head upon the arbor, and means for quickly positioning and firmly holding cutting bits or tools in the head.

Other features of novelty and improvement will be made apparent from the following detailed description of a preferred embodiment of the invention, which should be taken in connection with the accompanying drawings forming a part of this specification and wherein like reference characters refer to the same parts throughout.

In these drawings, Figure 1, is a perspective view showing the improved planer head, arbor and tools assembled in operative relation; and Fig. 2, is a longitudinal section through the planer head and tools.

The spindle or arbor carrying the planer head is designated by the reference numeral 11 which is provided with one or more longitudinal grooves 12. The planer head comprises a sleeve 13 having its two ends coned at 14 and split as indicated at 15 so as to render the same expansible within certain limits. Extending from the periphery of the sleeve and preferably near one end thereof is a flanged plate 16 which is fixed with relation to the sleeve 13 and may be advantageously formed integral therewith. This plate 16 may have an overhanging outer face 17 and is incut upon its inner face at 18 to form one-half of a dove tail groove for the reception and engagement of the bits or tools 19, the edges of which are beveled as indicated at 20, 20. The plate flange 16 is also provided at spaced intervals concentrically of the arbor and just within its incut periphery with apertures 21. A second plate 22 is movably mounted upon the sleeve 13 in opposition to the fixed plate 16 and has its inner face incut at 23 and apertured at 24 to correspond to the plate 16. When the bits or tools 19 are positioned between the plates 16 and 22 with their beveled edges 20 within and engaged by the incuts 18 and 23 with their cutting edges 25 in proper adjustment to perform the work required, bolts 26 are inserted within the registering apertures 21 and 24 with their heads 27 preferably countersunk in the overhanging face 17 of the plate 16 and nuts 28 threaded upon said bolts serve to draw the two plates toward each other and clamp the tools 25 firmly therebetween in adjusted relation.

In order to secure the head rigidly upon the arbor 11 clamping rings 29 and 30 which are inwardly coned at $29^a$ and $30^a$ are disposed upon the opposite coned ends of the sleeve 13. The clamping ring 30 is provided at spaced concentric intervals with apertures 31 into which are threaded the ends of screw bolts 32. These bolts extend through registering apertures 33 and 34 of the plates 16 and 22 respectively. The plate 29 is provided with correspondingly spaced apertures 35 through which the bolts 32 extend and have threaded upon their outer ends the nuts 35. It will be seen that by the tightening of the nuts 35 the two clamping rings 29 and 30 are drawn toward each other and caused to ride upwardly on the coned split ends of the sleeve 13 whereby the latter are forced inwardly into intimate gripping contact with the arbor 11.

In order to further insure against angular movement of the head with reference to the arbor, dowel pins 36 are mounted in the sleeve and project radially into the groove 12 of the arbor whereby to lock the two elements positively against such angular displacement.

Although we have described herein in detail various structural features and characteristics which we have found to be advantageous, it is to be noted that the invention is not limited to these constructional details since many minor mechanical changes can be made in the device without departing from the substance and essence of the invention.

We claim:

1. In mechanism of the character described, the combination, with the arbor, of a sleeve having coned ends, a fixed plate carried by the sleeve and having its inner face provided with tool engaging means, said plate also provided with spaced apertures, a second plate movably mounted on the sleeve in opposition to the first plate, and apertured to correspond thereto, said second plate also having its inner face provided with tool engaging means, bolts disposed within the apertures and bearing on the outer faces of the plates to clamp the same upon the tools, interiorly coned clamping rings mounted one on each end of the sleeve, and means interlocking with the second plate to draw the clamping rings together to clamp the sleeve upon the arbor, substantially as described.

2. In mechanism of the character described, the combination of a sleeve having split ends, a fixed plate carried by the sleeve having its inner face incut near the periphery, a second plate movably mounted on the sleeve in opposition to the first plate and incut to correspond thereto, the incut opposed faces of the plates adapted to receive tools, means for clamping tools between said plates, interiorly coned apertured clamping rings mounted one on each split end of the sleeve, and bolts interlocked with the plates and disposed within the apertures of the clamping rings to draw the same together and clamp the ends of the sleeve upon the arbor, substantially as described.

3. In mechanism of the character described, the combination of a sleeve adapted to fit upon an arbor and having coned split ends, a fixed plate flange formed near one end of the sleeve and having its inner face incut near the periphery and also provided with bolt apertures, the second plate slidably mounted on the sleeve in opposition to the first plate and incut and apertured to correspond thereto, the incut opposed faces of the plates adapted to receive the opposite edges of tools, bolts disposed within the apertures to clamp the same upon the tools, interiorly coned apertured clamping rings mounted one on each end of the sleeve, and bolts disposed within the apertures of the ring and passing through the plates to draw the clamping rings together and contract the split ends of the sleeve, substantially as described.

FRANKLIN L. LANE.
HARRISON J. MITCHELL.

Witnesses:
F. A. HORSTMANN,
JANIE HAMLIN.

---

Copies of this patent may be obtained for five cents each, by addressing the "Commissioner of Patents, Washington, D. C."